United States Patent [19]

Podjan

[11] 4,204,500
[45] May 27, 1980

[54] BIRD FEEDER CONSTRUCTION

[76] Inventor: Walter H. Podjan, 1500 Rocky Gap, Benton Harbor, Mich. 49022

[21] Appl. No.: 914,343

[22] Filed: Jun. 12, 1978

[51] Int. Cl.² ............................................. A01K 39/01
[52] U.S. Cl. ..................................................... 119/52 R
[58] Field of Search .......................... 119/52 R, 53, 54; 229/23 BT; 222/523

[56] References Cited
U.S. PATENT DOCUMENTS

| | | | |
|---|---|---|---|
| 1,790,045 | 1/1931 | Harvey | 119/52 R |
| 2,912,785 | 11/1959 | Nudell | 220/8 X |
| 2,987,041 | 6/1961 | Bard | 119/51 R X |
| 3,961,444 | 6/1976 | Skaife | 220/8 X |

*Primary Examiner*—Louis G. Mancene
*Assistant Examiner*—Robert P. Swiatek
*Attorney, Agent, or Firm*—Blanchard, Flynn, Thiel, Boutell & Tanis

[57] ABSTRACT

A bird feeder which includes top and bottom walls joined by an intermediate sidewall structure which defines therein an interior storage compartment for feed. The sidewall structure is of a collapsible tubular structure formed from a plurality of interfitting concentric rings which telescope one within another. The uppermost ring is fixed to the top wall, and the latter has an opening therethrough for filling of the feeder. A decorative pluglike cover is postionable within the opening, and can be raised and horizontally hinged relative to the top wall to expose the opening when filling of the feeder is desired.

4 Claims, 12 Drawing Figures

U.S. Patent   May 27, 1980   Sheet 1 of 3   4,204,500
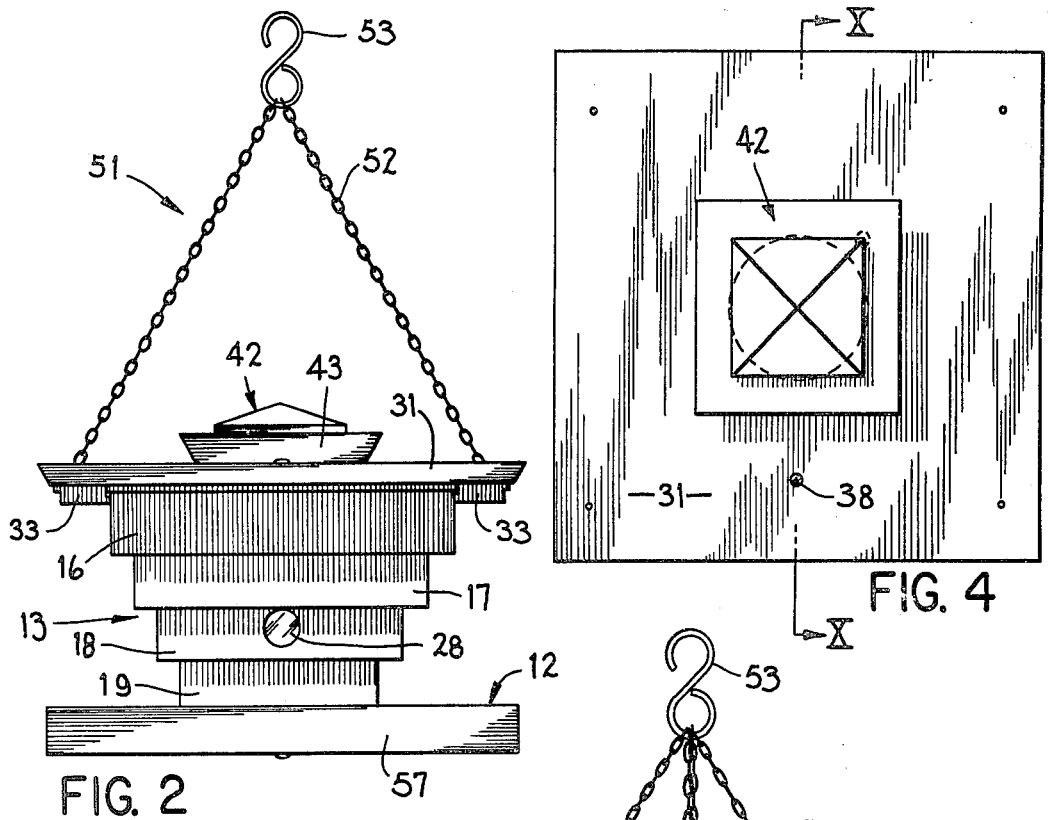
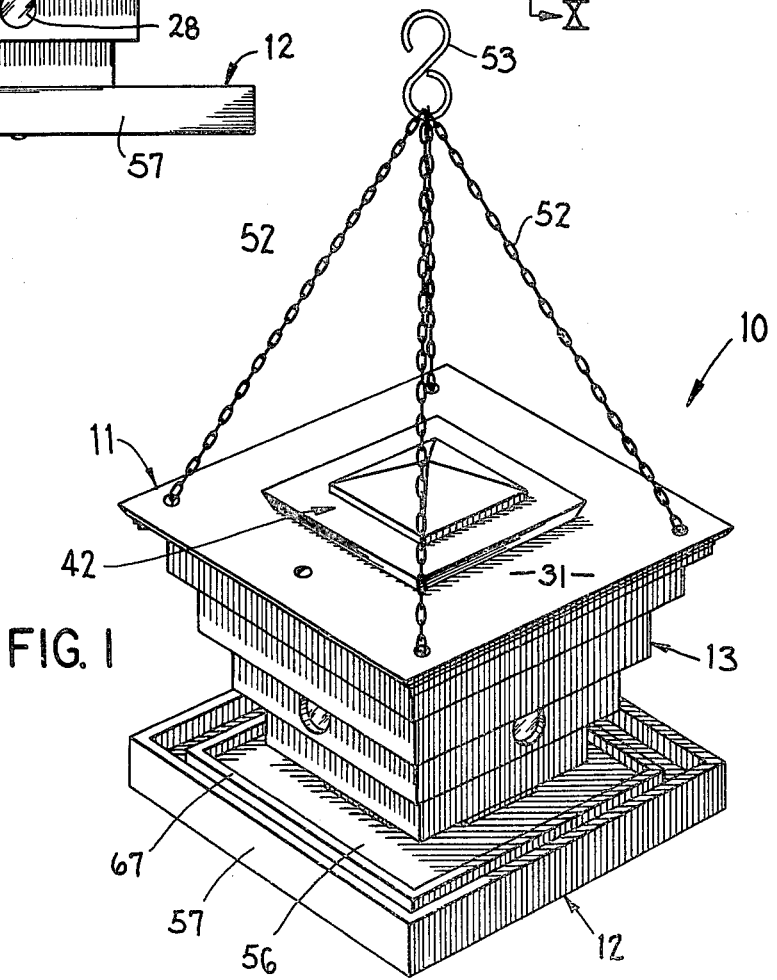

BIRD FEEDER CONSTRUCTION

FIELD OF THE INVENTION

This invention relates to an improved feeder, particularly for birds.

BACKGROUND OF THE INVENTION

Bird feeders conventionally employ a plurality of sidewalls formed of wood or glass and defining an interior storage compartment for feed. At least some of the side-walls are normally tapered inwardly to assist the feed in being discharged downwardly onto a feed table in accordance with the rate at which the feed is consumed. These known feeders are conventionally of a rigid structure and hence, if preassembled, are thus of substantial size so that transporting and handling of the feeders is difficult. To avoid this disadvantage, many feeders are sold in kit or disassembled form, whereby the purchaser assembles the bird feeder prior to use thereof. This is also undesirable since many purchasers would prefer to avoid this task.

Another disadvantage of known bird feeders in the difficulty encountered in filling the interior storage compartment with feed. With many feeders, it is necessary to remove the top of the feeder, and this is difficult in those instances where the feeder is suspended from above, as by a chain.

Accordingly, it is an object of this invention to provide an improved bird feeder which overcomes many of the disadvantages experienced with previously known feeders. More specifically, it is an object of this invention to provide an improved feeder, as aforesaid, which is of telescopic construction so that it can be fully assembled and yet collapse into a small and compact structure to facilitate shipping and handling thereof, while at the same time not requiring any assembly or manipulative operations by the purchaser inasmuch as the feeder will automatically extend into a fully operational position when suspended.

A further object is to provide an improved feeder, as aforesaid, which includes a removable top plug which functions both as a decorative part of the feeder and as a cover, which plug can be easily removed to facilitate filling of the feeder.

Still a further object is to provide an improved feeder, as aforesaid, which has a decorative and ornamental appearance so as to be aesthetically desirable when positioned in the vicinity of a residence, which permits simplified feeding on all sides thereof to thereby enable it to be supported in any desired location, and which readily visually indicates when refilling of the feeder is desired.

In addition to the above objects, the feeder of this invention can also be efficiently and economically produced, and is particularly desirable for distribution through commercial establishments due to its capability of being telescoped into a flat and compact package, even though the feeder remains fully assembled.

Other objects and purposes will be apparent to persons familiar with structures of this type upon reading the following specification and inspecting the accompanying drawings.

BRIEF DESCRIPTION OF THE DRAWINGS

FIG. 1 is a perspective view of the bird feeder according to this invention.

FIG. 2 is a front elevational view of the feeder, the rear view being identical thereto.

FIG. 4 is a top view of FIG. 2.

Figure 5:
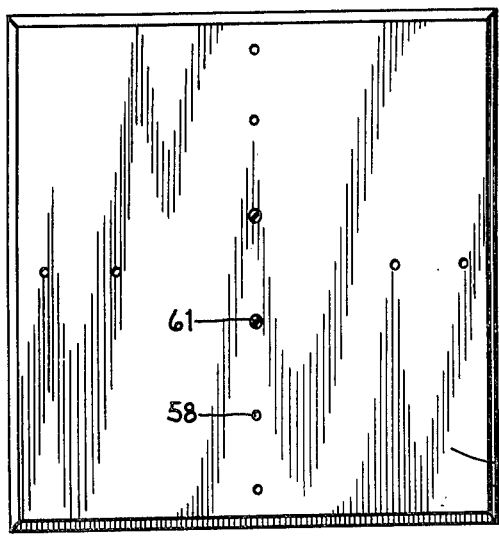
FIG. 5 is a bottom view.
Figure 3:
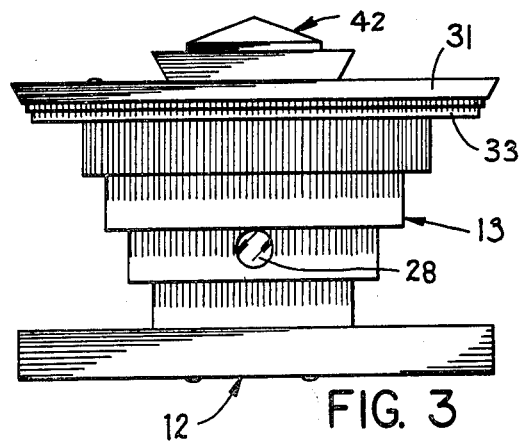
FIG. 3 is a side view of the feeder, with the support chains and hook omitted for convenience of illustration, with the opposite side being identical to the side illustrated in FIG. 3.

Certain terminology will be used in the following description for convenience in reference only and will not be limiting. For example, the words "rightwardly", "leftwardly", "upwardly" and "downwardly" will refer to directions in the drawings to which reference is made. The words "inwardly" and "outwardly" will refer to directions toward and away from, respectively, the geometric center of the structure and designated parts thereof. Said terminology will include the words specifically mentioned, derivatives thereof, and words of similar import.

SUMMARY OF THE INVENTION

The objects and purposes of this invention, including those mentioned above, are provided by a bird feeder which includes top and bottom walls joined by an intermediate sidewall structure which defines therein an interior storage compartment for feed. The sidewall structure is of a collapsible tubular structure formed from a plurality of interfitting concentric rings which telescope one within another. The uppermost ring is fixed to the top wall, and the latter has an opening therethrough for filling of the feeder. A decorative pluglike cover is positionable within the opening, and can be raised and horizontally hinged relative to the top wall to expose the opening when filling of the feeder is desired.

DETAILED DESCRIPTION

As illustrated in FIG. 1, this invention relates to an improved bird feeder 10 which includes vertically spaced top and base structures 11 and 12, respectively, joined together by an intermediate sidewall structure 13. This latter structure is of a tubular nature and defines a feed storage compartment 14 (FIG. 10) in the interior thereof.

Figure 10:
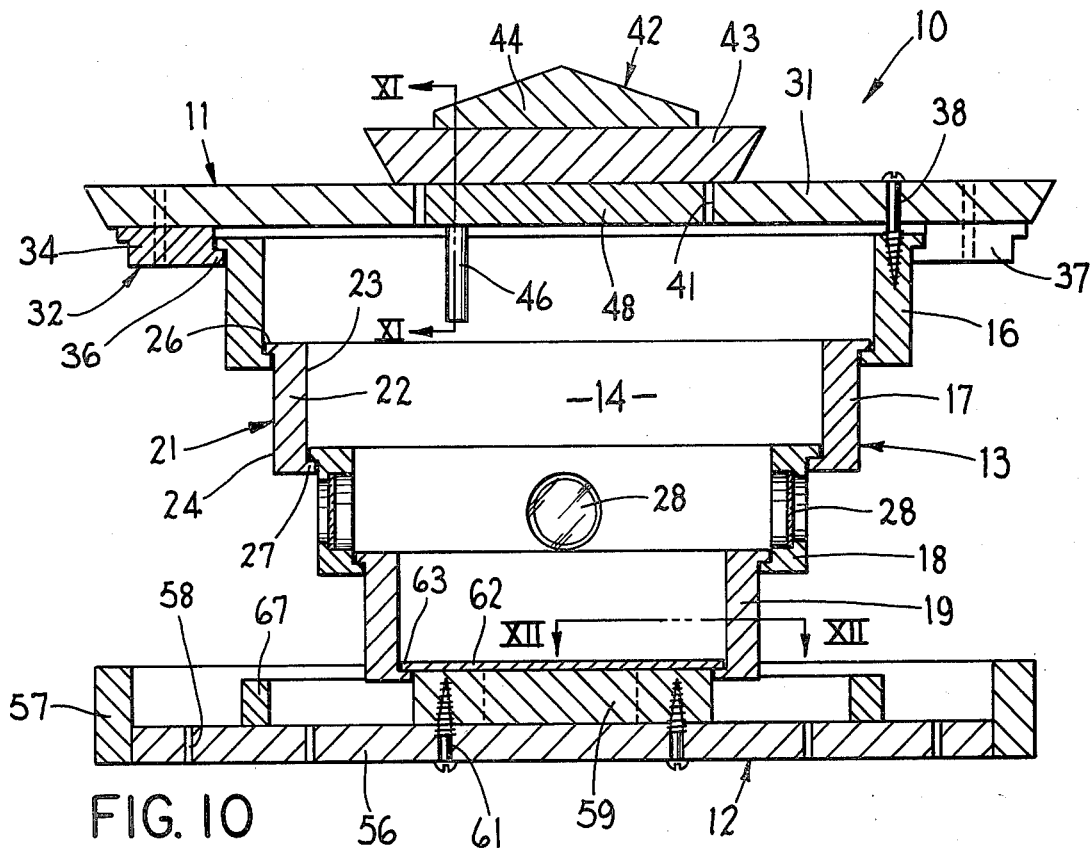
FIG. 10 is a central sectional view taken along line X—X in FIG. 4.
Figure 11:
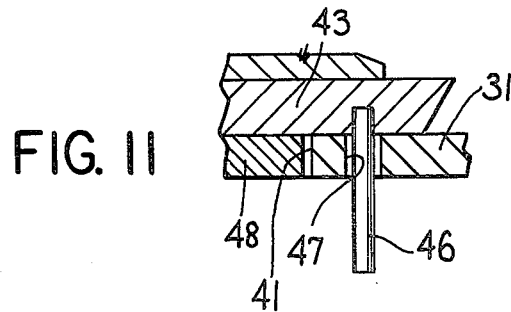
FIG. 11 is a fragmentary sectional view taken along line XI—XI in FIG. 10.

Considering first the sidewall structure 13, same is formed so as to be axially collapsed or extended, which relationship is achieved by forming the sidewall structure from a plurality of interfitting elements which telescope one within another. For this purpose, the structure 13 (as illustrated in FIG. 10) is formed from a plurality of interfitting rings, such as rings 16, 17, 18 and 19. These rings are of similar structure except that they are of progressively decreasing size so that they respectively interfit one within the other, whereby the sidewall structure 13 can be collapsed into a rather low and flat structure.

The ring 17, which is typical of the structure of the other rings, is of a polygonal shape, the illustrated embodiment having four sides of equal lengths with substantially right angle corners. Each side of ring 17 is formed by an elongated side element 21 which, in cross section is substantially Z-shaped. This side element 21 includes a substantially rectangular plate portion 22 which extends in the longitudinal direction of the side element and has opposed, substantially vertical, inner and outer side surfaces 23 and 24, respectively. The side element has a top flange 26 which extends outwardly beyond the outer side surface 24, and a similar bottom flange 27 projects inwardly beyond the inner side surface 23. These flanges cooperate with similar flanges on the other rings which are disposed within or around the ring 17 so that the plurality of rings which make up the sidewall structure 13 are thus axially joined together when held in a suspended state. This arrangement of flanges also enables the rings to be freely fitted one within another.

One of the rings, such as the ring 18, is provided with a small transparent window 28 in each of the side elements thereof to permit visual observation of the quantity of feed within the interior storage compartment.

The sidewall structure 13 is suspended from and rigidly connected to the top structure 11 which, for this purpose, includes a substantially planar top plate 31 having a U-shaped guide member 32 fixedly mounted on the underside thereof. This U-shaped guide member 32 includes opposed substantially parallel side rails 33 (FIG. 2) joined together by a rear rail 34. These rails 33 and 34 include, at their lower edge, an inwardly projecting guide flange 36. The front of the guide member 32 defines a sidewardly directed opening 37.

Sidewall structure 13 is mounted on the top structure 11 by sidewardly slidably inserting the top flange of ring 16 inwardly through the opening 37 so that the top flange of ring 16 is thus supported on the inner guide flange 36 defined by the U-shaped guide member 32. When so positioned, a wood screw 38 is extended downwardly through the top plate 31 into the ring 16 to positively prevent the sidewall structure 13 from sliding sidewardly off of the top structure.

The top plate 31 has a substantially circular feed opening 41 extending centrally therethrough for communication with the storage compartment 14. This opening 41 can be closed by a movable cover 42 which includes a cover plate 43 having an upwardly projecting decorative portion 44 thereon. The cover plate 43 is substantially square and is dimensionally larger than the opening 41 so as to fully cover same when the cover plate 43 is seated on the top plate 31.

The cover 42 is movably connected to the top plate 31 by an elongated pin 46 which is fixed to the cover adjacent one corner of the cover plate 43 and projects downwardly in perpendicular relationship therefrom. This guide pin 46 extends through a small hole 47 which extends through the top plate 31 adjacent but slightly spaced from the periphery of the feed opening 41. The cover also has a substantially cylindrical plug portion 48 fixed to and projecting downwardly from the cover plate 43. This plug portion 48 has an exterior diameter slightly smaller than the diameter of the feed opening 41, so that the plug portion will substantially occupy this opening when the cover is properly closed, as illustrated in FIG. 10.

Figure 7:
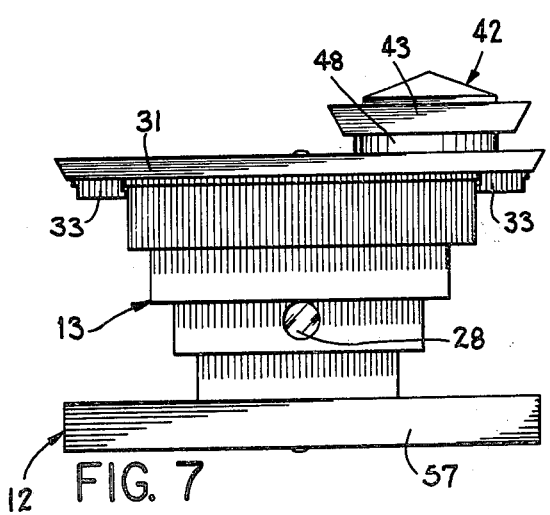
FIG. 7 is a front view corresponding to FIG. 2 but showing the top opening uncovered.
Figure 9:
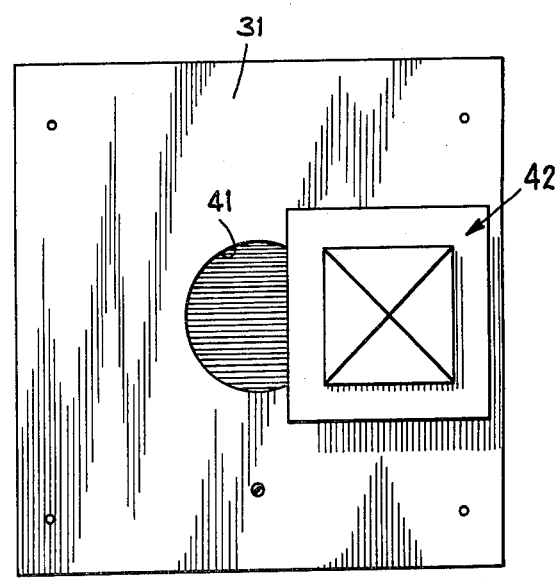
FIG. 9 is a top view of FIG. 7.
Figure 8:
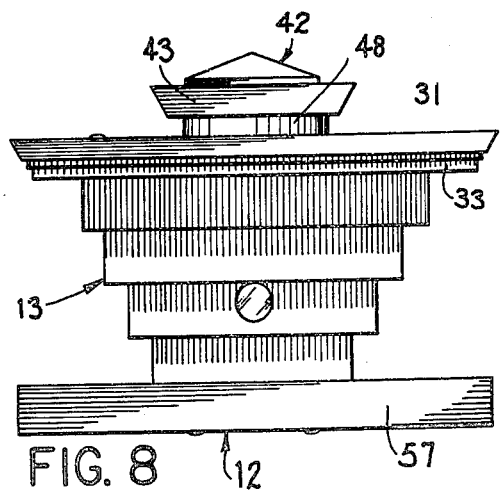
FIG. 8 is a side view of FIG. 7.

When the cover 42 is in the closed position, the guide pin 46 projects downwardly a substantial distance beyond the top plate 31 whereby, by lifting the cover 42 vertically upwardly so as to withdraw the plug portion 48 from the opening 41, the guide pin 46 will still be guided within the hole 47, whereupon the cover can then be horizontally rotated through an angle of approximately 90°, utilizing the pin 46 as a pivot, to thereby uncover the feed opening substantially as indicated in FIGS. 7-9.

The top structure 11 also has a suspending structure 51 (FIG. 1) associated therewith to enable the bird feeder to be suspended from any suitable means. This suspending structure 51 includes a plurality of elongated flexible elements 52, specifically chains, which are individually connected to the top plate 31 adjacent the corners thereof. These chains merge together adjacent their upper ends and are connected to a suitable mounting element, which element comprises an S-hook 53 in the illustrated embodiment.

Considering now the base structure 12, same includes a substantially square base plate 56 which is of substantially the same size as the top plate 31. This base plate has an upwardly projecting rim 57 secured thereto around the complete periphery thereof. A plurality of through holes 58 extend through the base plate for purposes of drainage.

A substantially octagonally-shaped mounting plate 59 is fixed to the base plate 56 and is centrally positioned on the upper surface thereof. This mounting plate 59, which is fixed to the base plate by screws 61, has a feed control plate 62 fixed to the upper end thereof. This feed control plate is also octagonal, similar to the underlying mounting plate 59, except that the plate 62 has sidewardly projecting support flanges 63 which are designed to overlap the lower flange associated with the lowermost ring 19 to thereby axially connect and suspend the base structure from this lowermost ring.

Figure 12:
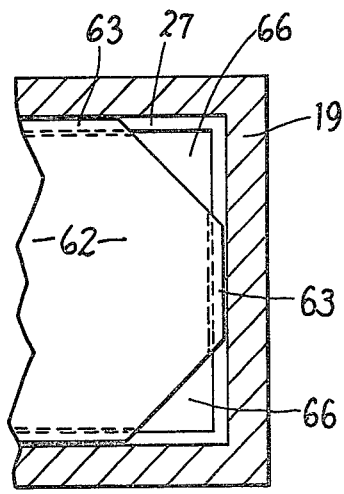
FIG. 12 is a fragmentary sectional view taken along line XII—XII in FIG. 10.

Due to the octagonal shape of the control plate 62 and the underlying mounting plate 59, and the fact that these plates are disposed within the surrounding lower ring 19 which is of a square configuration, there is thus defined a substantially triangular feed opening 66 (FIG. 12) at each corner of the ring 19. The four feed openings 66 as defined in this manner thus enable the bird feed within the storage compartment 14 to be gradually fed downwardly from the compartment onto the upper surface of the base plate 56, with the flow onto the base plate being controlled by the vertical spacing between the base plate and the lower edge of the bottom ring 19.

To confine the discharged feed in the vicinity of the openings 66, and to permit the feed to be collected so that it is conveniently available, the base plate also has a substantially square feed retainer ring 67 fixed to the upper surface thereof. This feed retainer ring surrounds and is spaced outwardly from the lower sidewall ring 19 to thereby define a confined region in which the discharged feed can collect.

Figure 6:
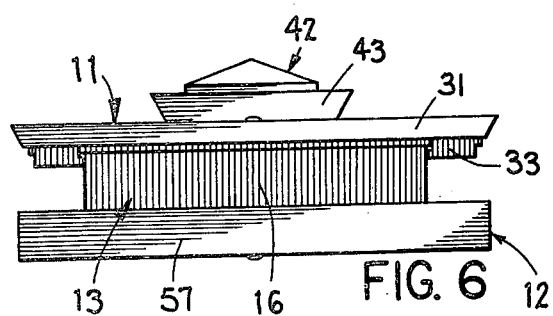
FIG. 6 is a front view corresponding to FIG. 2 but showing the feeder in a collapsed position.

With the bird feeder 10 assembled as above described, same can be collapsed into a compact configuration by enabling the tubular sidewall structure to be telescopically collapsed so that the feeder assumes the position illustrated in FIG. 6. When in this position, the uppermost ring 16 has the lower edge thereof disposed so that it is substantially resting on the feed retainer ring 67. On the other hand, when utilization of the feeder is desired, then application of an upward lifting force to the top structure 11, as by lifting upwardly on the hook 53, will result in the sidewall structure 13 fully expanding due to the weight of the base structure 12, so that the device can then be suspended as desired for utilization.

While the feeder as above described is designed primarily for use in a suspended condition, which suspension results in the feeder becoming automatically fully extended, it will be appreciated that the feeder can be mounted on a post or similar structure if desired. In this situation, if the base 12 is rigidly secured to a post or the like, then a suitable rigid retainer rod is extended vertically between the top and base structures to thereby prevent collapsing of the sidewall structure. One or more such vertical rods can be disposed at the corners of the feeder externally of the sidewall structure, or alternately one or more such rods can be positioned inside the sidewall structure.

The structure and operation of the feeder are believed self evident from the above description.

While the sidewall structure as above described discloses polygonal rings of a square configuration, it will be appreciated that the rings can be rectangular if desired. Further, the polygonal rings can have more or less than four sides, for example the rings could be triangular, or alternately the rings could be constructed from five or more sides. Further, the rings could be circular if desired, although this would obviously require that the individual rings be formed utilizing a different technique, such as molding the rings from a moldable material, such as a plastic material.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A bird feeder having vertically spaced top and base structures joined together by a tubular sidewall structure which defines therein a feed storage compartment, comprising the improvement wherein said sidewall structure includes a plurality of concentric and coaxially aligned rings which telescopically fit one within another when said sidewall structure is in a collapsed position whereby the top and base structures are positioned vertically closely adjacent one another, said rings having cooperating stops which limit the axial expansion of said sidewall structure so that said rings define an axially elongated tubular structure which provides a desired maximum vertical spacing between said top and base structures, said plurality of rings including an upper ring, a lower ring and at least one intermediate ring, each said ring having a pair of said stops defined by a radially outwardly projecting upper flange and a radially inwardly projecting lower flange which is spaced vertically downwardly a substantial distance from said upper flange, said intermediate ring being positionable within said upper ring and movable axially downwardly so as to project downwardly therefrom whereby the upper flange on said intermediate ring bears on the lower flange of said upper ring, and said lower ring being positionable within said intermediate ring and movable so as to project axially downwardly therefrom so that the upper flange on said lower ring bears on the lower flange of said intermediate ring, said top structure including top plate means having guide means associated with the bottom side thereof, said guide means defining sidewardly opening side rail means for slidably supporting thereon the top flange of said upper ring, whereby said upper ring can be sidewardly slidably displaced relative to said top structure so as to be separated therefrom.

2. A feeder according to claim 1, wherein said base structure includes an enlarged substantially horizontal base plate having an upwardly projecting mounting plate fixed centrally to the upper surface thereof, said mounting plate projecting upwardly into said lower ring, and a flow control plate fixed to the upper end of said mounting plate and projecting sidewardly therefrom so as to overlap the lower flange on said lower ring, whereby said base structure is secured to and suspended from said lower ring, said lower ring and said flow control plate defining therebetween a plurality of small openings for controlling the flow of feed from said storage compartment onto the upper surface of said base plate.

3. A feeder according to claim 2, wherein at least one of said rings has a plurality of transparent windows therein for permitting visual observation of the quantity of feed within said storage compartment.

4. A bird feeder having vertically spaced top and base structures joined together by a tubular sidewall structure which defines therein a feed storage compartment, comprising the improvement wherein said sidewall structure includes a plurality of concentric and coaxially aligned rings which telescopically fit one within another when said sidewall structure is in a collapsed position whereby the top and base structures are positioned vertically closely adjacent one another, said rings having cooperating stops which limit the axial expansion of said sidewall structure so that said rings define an axially elongated tubular structure which provides a desired maximum vertical spacing between said top and base structures, said plurality of rings including an upper ring, a lower ring and at least one intermediate ring, each said ring having a pair of said stops defined by a radially outwardly projecting upper flange and a radially inwardly projecting lower flange which is spaced vertically downwardly a substantial distance from said upper flange, said intermediate ring being positionable within said upper ring and movable axially downwardly so as to project downwardly therefrom whereby the upper flange on said intermediate ring bears on the lower flange of said upper ring, and said lower ring being positionable within said intermediate ring and movable so as to project axially downwardly therefrom so that the upper flange on said lower ring bears on the lower flange of said intermediate ring, said base structure including an enlarged substantially horizontal base plate having an upwardly projecting mounting plate fixed centrally to the upper surface thereof, said mounting plate projecting upwardly into said lower ring, and a flow control plate fixed to the upper end of said mounting plate and projecting sidewardly therefrom so as to overlap the lower flange on said lower ring, whereby said base structure is secured to and suspended from said lower ring, said lower ring and said flow control plate defining therebetween a plurality of small openings for controlling the flow of feed from said storage compartment onto the upper surface of said base plate.

* * * * *